(12) United States Patent
Rivers et al.

(10) Patent No.: US 7,736,559 B2
(45) Date of Patent: Jun. 15, 2010

(54) BINDING WOOD USING A THERMOSETTING ADHESIVE COMPOSITION COMPRISING A PROTEIN-BASED COMPONENT AND A POLYMERIC QUATERNARY AMINE CURE ACCELERANT

(75) Inventors: Jason D. Rivers, Monroe, GA (US); Brandi D. Johnson Griffin, Greensboro, NC (US); Cornel Hagiopol, Lilburn, GA (US); Robert A. Breyer, Tucker, GA (US); Winford Terry Liles, Jefferson, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 819 days.

(21) Appl. No.: 11/258,382

(22) Filed: Oct. 26, 2005

(65) Prior Publication Data
US 2006/0142433 A1 Jun. 29, 2006

Related U.S. Application Data

(63) Continuation-in-part of application No. 10/849,558, filed on May 20, 2004, now abandoned.

(51) Int. Cl.
*B32B 21/00* (2006.01)
*C07K 1/107* (2006.01)

(52) U.S. Cl. ............ 264/109; 156/330; 156/336; 162/71; 162/72; 264/112; 264/128; 264/171.24; 264/171.25; 264/241

(58) Field of Classification Search .......... 264/109, 264/112, 128, 171.24, 171.25, 241; 162/71, 162/72; 156/330, 336
See application file for complete search history.

(56) References Cited

U.S. PATENT DOCUMENTS

| | | | |
|---|---|---|---|
| 2,325,105 A | 7/1943 | Bruson et al. | |
| 2,810,657 A | 10/1957 | Preusser | |
| 2,872,421 A | 2/1959 | Shelton et al. | |
| 2,926,154 A | 2/1960 | Kelm | |
| 3,332,893 A | 7/1967 | Birum et al. | |
| 3,372,086 A | 3/1968 | Westfall et al. | |
| 3,513,597 A | 5/1970 | Groot et al. | |
| 3,607,622 A | 9/1971 | Espy | |
| 3,734,977 A | 5/1973 | Coscia at al. | |
| 3,878,135 A | 4/1975 | Keegan et al. | |
| 3,914,155 A | 10/1975 | Horowitz | |
| 3,926,870 A | 12/1975 | Keegan et al. | |
| 4,233,411 A | 11/1980 | Ballweber et al. | |
| 4,282,119 A | 8/1981 | Tinkelenberg et al. | |
| 4,311,619 A | 1/1982 | Seeney et al. | |
| 4,474,694 A | 10/1984 | Coco et al. | |
| 4,554,337 A | 11/1985 | Krinski et al. | |
| 4,687,826 A | 8/1987 | Steinmetz et al. | |
| 4,722,964 A | 2/1988 | Chan et al. | |
| 4,915,766 A | 4/1990 | Baxter | |
| 5,153,242 A | 10/1992 | Timm et al. | |
| 5,286,363 A | 2/1994 | Anderson et al. | |
| 5,344,871 A | 9/1994 | Timm et al. | |
| 5,362,842 A | 11/1994 | Graves et al. | |
| 5,389,716 A | 2/1995 | Graves | |
| 5,395,494 A | 3/1995 | Anderson et al. | |
| 5,455,066 A | 10/1995 | Broich et al. | |
| 5,585,456 A | 12/1996 | Dulany et al. | |
| 5,593,625 A | 1/1997 | Reibel et al. | |
| 5,766,331 A | 6/1998 | Krinski et al. | |
| 6,231,985 B1 | 5/2001 | Chen et al. | |
| 6,306,997 B1 | 10/2001 | Kuo et al. | |
| 6,365,650 B1 | 4/2002 | Chen et al. | |
| 6,395,356 B1 | 5/2002 | Wielockx et al. | |
| 6,497,760 B2 | 12/2002 | Sun et al. | |
| 6,518,387 B2 | 2/2003 | Kuo et al. | |
| 6,607,619 B1 | 8/2003 | Foucht et al. | |
| 6,627,131 B2 | 9/2003 | Huber | |
| 6,719,882 B2 | 4/2004 | Vijayendran et al. | |
| 6,790,271 B2 | 9/2004 | Thames et al. | |
| 7,207,793 B2 | 4/2007 | Huber | |
| 2002/0005251 A1 | 1/2002 | Sun et al. | |
| 2002/0153112 A1 | 10/2002 | Vijayendran et al. | |
| 2003/0148084 A1 | 8/2003 | Trocino, Sr. | |
| 2004/0037906 A1 | 2/2004 | Li et al. | |
| 2004/0089418 A1 | 5/2004 | Li | |

(Continued)

FOREIGN PATENT DOCUMENTS

EP 00997513 A1 10/1999

(Continued)

OTHER PUBLICATIONS

Bian et al., "Adhesive Performance of Modified Soy Protein Polymers", Polym. Prep., Am. Chem. Soc. Div., Polym. Chem., vol. 39, pp. 72-73, dated 1988.

(Continued)

*Primary Examiner*—Ana L Woodward
(74) *Attorney, Agent, or Firm*—Michael S. Kerns

(57) ABSTRACT

Thermosetting adhesive compositions for use in e.g., particleboard or fiberboard, wherein the compositions comprise a blend of a protein-based component and a polymeric quaternary amine cure accelerant, can provide the fast tack-building and curing, as well as ultimately good bonding characteristics normally associated with synthetic resin compositions. Preferably, the polymeric quaternary amine cure accelerant is the reaction product of a polyamidoamine and epichlorohydrin.

8 Claims, No Drawings

U.S. PATENT DOCUMENTS

| | | |
|---|---|---|
| 2004/0220368 A1 | 11/2004 | Li et al. |
| 2005/0070635 A1 | 3/2005 | Breyer et al. |
| 2005/0166796 A1 | 8/2005 | Sun et al. |
| 2005/0222358 A1 | 10/2005 | Wescott et al. |
| 2005/0261404 A1 | 11/2005 | Rivers et al. |
| 2005/0272892 A1 | 12/2005 | Hse et al. |
| 2005/0277733 A1 | 12/2005 | Wescott et al. |
| 2006/0231968 A1 | 10/2006 | Cowan et al. |
| 2006/0234077 A1 | 10/2006 | Breyer et al. |

FOREIGN PATENT DOCUMENTS

| | | |
|---|---|---|
| GB | 483550 | 4/1938 |
| JP | 50-34632 A | 4/1975 |
| JP | 81045957 | 10/1981 |
| JP | 58034877 A | 3/1983 |
| JP | 4-057881 A1 | 2/1992 |
| JP | 6200226 A | 7/1994 |
| WO | 99/61538 A1 | 12/1999 |
| WO | WO 01/59026 | 8/2001 |

OTHER PUBLICATIONS

Kirk-Othmer, "Soybeans and other Oilseeds" Encyclopecdia Of Chemical Technology, vol. 21, 3$^{rd}$ Ed., pp. 418-422, dated 1983.

Kirk-Othmer, "Soybeans and other Oilseeds" Encyclopedia of Chemical Technology, vol. 22, 4$^{th}$ Ed., pp. 591-619, 1997.

Mo et al., "Compression and Tensile Strength of Low-Density Straw-Protein Particleboard", Industrial Crops and Products, vol. 14. pp. 1-9, 2001.

Hojilla-Evangelista, et al., "Foaming Properties of Soybean Protein-Based Plywood Adhesives", JAOCS,, vol. 78, No. 6, pp. 567-572, 2001.

Kuo, et al., "Properties of Wood/Agricultural Fiberboard Bonded With Soybean-Based Adhesives," Forest Products Journal, vol. 48, No. 2, pp. 71-75, dated Feb. 1998.

Krinski, et al., "Emerging Polymeric Materials Based on Soy Protein," American Chemical Society, pp. 299-312, 1992.

Hojilla-Evangelista, et al., "Adhesive Qualities of Soybean Protein-Based Foamed Plywood Glues", JAOCS, vol. 79, No. 11, pp. 1145-1149, 2002.

Sun et al., "Plastic Performance of Soybean Protein Components" JAOCS, vol. 76, No. 1, pp. 117-123, 1999.

Conner, et al., Soybean-Based Wood Adhesives, JAOCS, vol. 66, No. 4, p. 437, 1989.

Yang et al., "Soybean-Based Wood Adhesives for Structural Panels", Citations from Dissertation Abstracts, vol. 63-04B, pp. 1625, 2002.

Colen, "A Study to Ascertain the Viability of Ultrasonic Nondestructive Testing to Determine the Mechanical Characteristics of Wood/Agricultural Hardboards with Soybean Based Adhesives" UMI Dissertation Services, 1998.

Karcher, "Incorporation of Corn- And Soybean-Based Materials Into Plywood Adhesives" University of Illinois Thesis, pp. 115-216, 1997.

Schmitt "Startup Firm Stuck On Soybeans" Chemical Week, pp. 9, Mar. 13, 2002.

Partington, "United Soybean Board Unveils Soy-Based Wood Adhesive" Adhesives Age, pp. 46, Oct. 1996.

"Soybean Based Adhesives Developed For Wood Applications", Adhesives Age pp. 40, Apr. 1994.

Lorenz, et al., "The effect of Soy Protein Additions on the Reactivity and Formaldehyde Emissions of Urea-Formaldehyde Adhesive Resins" Forest Products Journal, vol. 49, No. 3, pp. 73-78, Mar. 1999.

Koch, "Utilization of Hardwoods Growing on Southern Pine Sites", US Department of Agriculture,, Forest Service, Agriculture Handbook, 1985.

Maloney, "Modern Particleboard and Dry-Process Fiberboard Manufacturing" Miller Freeman Publications, San Francisco, CA, pp. 25-29 and 626-634, 1993.

Heiss, et al., "Influence of Acids and Bases on Preparation of Urethane Polymers," Industrial and Engineering Chemistry, vol. 51, No. 8, Aug. 1959, pp. 929-934.

Suchsland et al., "Fiberboard Manufacturing Practices in the United States", US Department of Agriculture Forest Service, Agriculture Handbook No. 640, Mar. 3, 1987.

Huang, W. and X. Sun, "Adhesive Properties of Soy Proteins Modified by Sodium Dodecyl Sulfate and Sodium Dodecylbenzene Sulfonate," Journal of the American Oil Chemists Society, 77(7), 2000, pp. 705-708.

Lay, D. and P. Cranley, "Polyurethane Adhesives," Handbook of Adhesive Technology, 2nd edition (2003), pp. 704-705.

US 7,736,559 B2

BINDING WOOD USING A THERMOSETTING ADHESIVE COMPOSITION COMPRISING A PROTEIN-BASED COMPONENT AND A POLYMERIC QUATERNARY AMINE CURE ACCELERANT

This application is a continuation-in-part of U.S. application Ser. No. 10/849,558, filed May 20, 2004.

FIELD OF THE INVENTION

The present invention relates to an improved process for making wood composites (e.g., particleboard) using a thermosetting adhesive composition, comprising a protein-based component and a polymeric quaternary amine cure accelerant.

BACKGROUND OF THE INVENTION

Petroleum-based and protein-based adhesives are two general categories of adhesives used in wood composite applications, such as in the manufacture of particleboard, fiberboard, waferboard, oriented strand board (OSB), plywood, and laminated veneer lumber (LVL) from wood particles, fibers, and/or veneers. Both categories of adhesives are known for their ability to polymerize or cure upon heating, thereby bonding wood particles together. Petroleum-based adhesives are known to provide excellent bonding of wood.

In contrast to protein-based adhesives, however, petroleum-based adhesives are not renewable substances that can reduce the dependency on petroleum-based chemicals. Also, petroleum-based adhesives are not biodegradable, so that their use results in an unwanted accumulation of waste. Moreover, stringent regulations on toxic emissions from building materials complicate the use of petroleum-based resins. In particular, most petroleum-based adhesives contain formaldehyde which can contribute to environmental concerns. Despite the relative performance advantages of petroleum-based adhesives, therefore, the art has recognized the potential attractiveness of using protein-based adhesives as alternatives, in order to reduce the usage of petrochemicals and mitigate possible environmental pollution.

For example, protein glues, such as various casein, blood, and soy glue compositions, have been investigated and are discussed in detail, for example, in the Background section of U.S. Pat. No. 6,306,997. The '997 patent itself describes a soybean-based adhesive, containing a cross-linking agent (e.g., a phenol-formaldehyde resin) for preparing wood composite panels.

U.S. Pat. Nos. 6,365,650 and 6,231,985 describe an adhesive suitable for preparing wood composites formed by combining an isocyanate prepolymer with hydrolyzed soy protein at a weight ratio of prepolymer:soy protein in the range of 70:30 to 90:10, i.e., a weight excess of the prepolymer.

U.S. Published Application No. 2002/0153112 A1 describes cellulosic fiber composites (e.g., oriented strand board) having a reduced amount of petrochemicals due to the presence of protein hydrolysates. The composites comprise cellulosic material and a resin binder.

U.S. Pat. No. 5,593,625 describes a particulate material that is formed from a fibrous cellulosic material (e.g., recycled newspaper) and a protein-based resin prepared from a ground leguminous material (e.g., soy flour). The fibrous cellulosic material is combined with the aqueous protein-based resin to form the discrete biocomposite particles. In a preferred embodiment, the particulate material is used to make pressure-formed materials.

U.S. Pat. Nos. 5,344,871 and 5,153,242 describe binders and their use in forming composition board. The binders include high protein agricultural products such as soybean. Binders are taught to be principally protein but cross-linking additives including isocyanates, hindered isocyanates, and diisocyanates may be added.

U.S. Pat. No. 4,282,119 describes an amino resin adhesive, such as a urea-formaldehyde adhesive, with reduced formaldehyde emission by virtue of adding 2-20% by weight of a protein soluble or dispersible in the resin solution. Blood albumin is the preferred protein.

Japanese Patent 81045957 describes adhesives comprising an aqueous solution of animal or vegetable protein (e.g., soy protein) and isocyanate compounds.

Japanese Published Application 4057881 describes compositions containing an isocyanate compound and a water dispersible and/or water soluble polymer (e.g., soluble protein).

Despite the great effort that has been undertaken to develop protein-based adhesives, there remains a need in the art for thermosetting compositions that not only comprise a protein-based component, but also exhibit good bond strength, quick curing properties, and other desirable characteristics traditionally associated with petroleum-based resins. Additionally, such compositions will ideally not contain formaldehyde.

U.S. Published Patent Application US2004/0089418 describes using an adhesive composition for binding wood that comprises a reaction product of (i) a first ingredient selected from a soy protein or lignin and (ii) at least one substantially formaldehyde-free curing agent that includes at least one amine, amide, imine, imide, or nitrogen-containing heterocyclic functional group that can react with at least one functional group of the soy protein, or using an adhesive composition that comprises a reaction product of (i) a protein or lignin, (ii) a first compound that includes at least one amine, amide, imine, imide or nitrogen-containing heterocyclic functional group that can react with at least one functional group of the protein and (iii) a curing agent.

SUMMARY OF THE INVENTION

An improved process has now been discovered using thermosetting compositions comprising a protein-based component and a polymeric quaternary amine cure accelerant for bonding wood. Such an adhesive can provide fast tack-building and curing, as well as good bonding characteristics normally associated with wholly synthetic resin compositions. These thermosetting compositions are applicable in the production of wood composites such as particleboard, fiberboard, and plywood.

Accordingly, in one embodiment the present invention is a thermosetting adhesive composition comprising a protein-based component and a polymeric quaternary amine cure accelerant. In a preferred embodiment, the polymeric quaternary amine cure accelerant is the reaction product of a polyamidoamine and a halohydrin.

In another embodiment, the present invention is a method for making a thermosetting adhesive composition. The method comprises mixing a protein-based component with an aqueous solution of a polymeric quaternary amine cure accelerant.

In another embodiment, the present invention is a thermosetting cellulosic composition comprising a protein-based component, a polymeric quaternary amine cure accelerant, and a cellulosic material.

In another embodiment, the present invention is a wood composite product comprising a cellulosic material bonded together with a thermosetting adhesive composition comprising a protein-based component and a polymeric quaternary amine cure accelerant.

In another embodiment, the present invention is a method of making a wood composite. The method comprises applying a thermosetting adhesive composition comprising a protein-based component and a polymeric quaternary amine cure accelerant, to a cellulosic material to yield a thermosetting cellulosic composition. The method further comprises consolidating, usually with heating and pressing, the thermosetting cellulosic composition to yield the wood composite.

In another embodiment, the present invention is a method of making a wood composite where in the adhesive used is the powdered form of the soy flour with the polymeric quaternary amine cure accelerant supplied as an aqueous solution, slurry or suspension. In wood based composites the moisture content of the mat as it goes into the hot press is very critical. If the moisture is too high then the steam pressure build during pressing will cause the boards to delaminate upon release of the press. The soy protein has very limited solubility and if the concentration of soy in an aqueous mixture goes over 20-30% the material becomes very viscous. This viscosity causes problems with pumping the material and blending it with the wood. If the viscosity is lowered by diluting the material, then too much water may be added to the panel, increasing its moisture content and this would lead to the delimitation of the final product. The mill can reduce this problem by over drying the substrate but this incurs added cost and increases fire hazards. By adding one of the components, preferably the soy, as a solid (powder) the overall solids of the adhesive package is increased and these problems are reduced. This can be used in concert with a higher solids polymeric quaternary amine and the problem is reduced even further.

These and other embodiments are apparent from the following Detailed Description.

DETAILED DESCRIPTION OF THE INVENTION

Any source of protein is suitable for use in preparing the protein-based component of the thermosetting adhesive composition of the present invention, including any synthetic or natural protein such as plant or animal proteins. The protein may be water soluble or water insoluble. The protein may be enzymatically modified, chemically modified or the product of genetic engineering technology. The protein may be substantially pure or may be a part of a mixture such as in a grain fraction. Proteins that may be used to prepare the protein-based component therefore include, but are not limited to, grain proteins such as corn, wheat, barley, rice, oat, soya and sorghum proteins and protein fractions obtained from such grains, including gluten and prolamines such as zein, glutenin and gliadin; and animal proteins such as collagen, egg and milk proteins including gelatin, egg albumin (ovalbumin), lactalbumin, casein and sodium caseinate, whey, and milk isolates such as blends of caseinate and whey.

In a preferred embodiment, the protein-based component of the thermosetting adhesive composition of the present invention comprises soy protein. Information on soy protein can be found in, for example, Kirk-Othmer, ENCYCLOPEDIA OF CHEMICAL TECHNOLOGY, 3$^{rd}$ Ed., Vol. 21, p. 418-422 (1983). If soy protein is used, any source of soy protein, including soybean flour, soy protein isolate, soybean concentrate, and soybean meal, is suitable. The soy protein is preferably essentially free of urease. Independent of the source, it is generally preferable that the soy contain more protein than carbohydrate. For example, a preferred source of soy protein is soybean flour that has been defatted. Commercially-available defatted soybean flour is produced by extractive separation of soy oil from ground soy flakes. This process generally yields soybean powder having greater than 50% protein by weight. Preferably, the protein-based component comprises a soy product having a protein level of at least about 50% by weight, more preferably at least about 70% by weight, and even more preferably from about 70 to about 75% by weight. Specific examples of especially preferred soy products having high protein levels include NutriSoy 7B™ (available from Archer Daniels Midland) and Honeysoy 90™ (available from Cenex Harvest States).

Modified forms of soy protein are also known in the art and are suitable for use as the protein-based component of thermosetting compositions of the present invention. Modified proteins include proteins that are chemically or enzymatically hydrolyzed, acylated, oxidized, reduced, and/or denatured to increase solubility, decrease viscosity, increase stability, increase adhesive strength, reduce heat sensitivity, or effect other desired properties of the protein.

Soy protein hydrolyzates are known in the art and represent a preferred modified form of soy protein and are generally prepared by hydrolyzing soy protein powder with an aqueous caustic solution. The resulting protein hydrolyzate generally has a pH of greater than about 9 and typically between about 9.5 and 12. Consequently, the hydrolyzed soy protein molecules are highly polar. Treatment of soy protein with soluble caustic can be desirable because the caustic breaks the internal hydrogen bonds of the coiled protein molecules and maximizes the utility of their complex polar structure available for adhesion to wood. See Bian, et al., "Adhesive Performance of Modified Soy Protein Polymers", Polym. Prep., Am. Chem. Soc. Div., Polym. Chem., Volume 39 (1988), pp. 72-73. Without being bound by theory, a major mechanism of protein gluing involves the dispersing and unfolding of protein molecules in solution so that the unfolded molecules, having increased surface area, can contact an increased area of the substrate (e.g., wood) to which they are bonded. Additionally, the unfolded protein molecules become entangled during the curing process and thereby improve bond strength.

Appropriate caustics for use in hydrolyzing soy protein include, for example, the oxides, hydroxides, and the like, of alkali metals and alkaline earth metals, caustic alcohols, and the like. Representative suitable caustics include, for example, NaOH, CaO, $CH_3ONa$, $C_2H_5ONa$, $C_3H_7ONa$, and mixtures thereof. Non-caustic bases also can be used, including $NH_4OH$ and various amine bases. Reaction temperatures typically range from 25° C.-120° C., with corresponding reaction times normally ranging from 1-7 hours.

Other modified soy proteins that may be used in the protein-based component of the present invention include those described in U.S. Published Application No. 2002/0005251 A1. This publication describes modified soy protein-based adhesives that are prepared in an aqueous dispersion by reacting soy protein, preferably derived from soy protein isolate (SPI) and a modifier, which acts to unfold or denature the protein for increased adhesion. The modifiers are in two general categories: (1) saturated and unsaturated alkali metal $C_8$-$C_{22}$ sulfate and sulfonate salts (e.g., sodium dodecylbenzene sulfonate and sodium dodecyl sulfate) and (2) compounds of the formula $R_2N—(C=X)—NR_2$, where R is H or a $C_1$-$C_4$ saturated or unsaturated alkyl and X is O, NH, or S (e.g., urea and guanidine hydrochloride).

Further types of modified soy proteins that are known in the art also may be used in the protein-based component of thermosetting adhesive compositions of the present invention. These modified soy proteins include soy proteins that are reacted with a number of modifiers that can impart various properties to the soy protein as described above. Such modifiers and resulting modified soy proteins are described, for example, in U.S. Patent Application No. 2003/0148084 A1 and U.S. Pat. Nos. 5,766,331; 4,687,826; 4,554,337; 4,474,694 and 3,513,597.

As stated above, thermosetting adhesive compositions of the present invention include a protein-based component and a polymeric quaternary amine cure accelerant. Without being bound by theory, the cure accelerant is believed to act as a cross-linking agent of the functional groups of the protein, thereby reducing the time needed for the composition to cure and/or improving bond strength, compared to protein-based resins without added accelerant.

Polymeric quaternary amines suitable as a cure accelerant can include any polymer having quaternary amine (e.g., quaternary alkylalkanolamine) or ammonium (e.g., dimethylethanolbenzyl ammonium) functional groups. These functional groups can be incorporated onto a variety of polymeric structures (i.e., polymer backbones) including polyethers, polyolefins (e.g., polypropylene); polyacrylamides; polystyrene that may be cross-linked, e.g., with divinylbenzene; polymethacrylate and methacrylate co-polymers; agarose; and cellulose. Such polymeric quaternary amines are generally known to exhibit strong anion exchange capacity and are commercially available from a number of suppliers including Amersham Biosciences, J. T. Baker, Biochrom Labs, Bio-Rad, Ciphergen, Degussa, Dow Liquid Separations, Millipore, Novagen, Rhom & Haas, Sigma-Aldrich, Tosoh Biosep, Transgenomic, Whatman, and others.

A preferred quaternary amine accelerant is a polyazetidinium-based resin, having pendant azetidinium groups containing positively-charged nitrogen atoms in their quaternary amine structures. These cationic polyazetidinium resins are well known in the art as useful for imparting wet strength to paper and paper products. The surprising utility of quaternary amine resins as a cure accelerant in thermosetting adhesive compositions comprising a protein-based component, however, has been heretofore unrecognized in the art.

Polyazetidinium resins, known as polyamidoamine-halohydrin (or generally polyamide-halohydrin) resins, are the reaction product of a polyamidoamine and a halohydrin (e.g., epichlorohydrin). Polyamidoamines, in turn, are prepared from the reaction of a polyamine (e.g., a polyalkylene polyamine such as diethylenetriamine) and a polycarboxylic acid (e.g., a dicarboxylic acid such as succinic acid). Depending on the mole ratio of the polyamine and polycarboxylic acid, the resulting polyamidoamine may retain predominantly primary amine groups or predominantly carboxylic acid groups at the terminal polymer ends. These termini may also have secondary or tertiary amine moieties. Details pertaining to the possible reactants that may be used to prepare polyamidoamines and the resulting polyamidoamine-halohydrin quaternary amine resins, as well as the reaction conditions and synthesis procedures, are described in U.S. Pat. No. 2,926,154, which refers specifically to polyamidoamine-epichlorohydrin resins.

Various modified polyamidoamine-halohydrin resins, which are also quaternary amine resins, are known in the art and are suitable for use as the cure accelerant component of thermosetting adhesive compositions of the present invention. For example, U.S. Pat. No. 5,585,456 describes linking the primary amine ends of polyamidoamine oligomers, synthesized as described above, by reaction with a dialdehyde (e.g., glyoxal). The resulting "chain-extended" polyamidoamine polymer is thereafter contacted with a halohydrin to react with the remaining available amine groups and thereby yield an aqueous polyazetidinium resin having hydrolyzable bonds in its polymer structure. Other modified forms of the cationic, water-soluble polyamidoamine-halohydrin resins useful as polymeric quaternary amines of the present invention include those modified forms described in U.S. Pat. Nos. 3,372,086; 3,607,622; 3,734,977; 3,914,155; 4,233,411, and 4,722,964.

In a preferred embodiment of the present invention, the two adhesive components are supplied in a way to minimize, or more appropriately, control the level of moisture added to the wood via the adhesive prior to board consolidation. In this embodiment, the protein-based component is generally preferred to be present in solid powder form (e.g., as a soy protein powder) that is blended or mixed into an aqueous suspension or solution of the polymeric quaternary amine cure accelerant, to yield a thermosetting adhesive composition in the form of an aqueous solution or suspension. Otherwise, the protein-based component may be itself in the form of a liquid suspension (e.g., as an aqueous liquid suspension), solution, or dispersion and admixed with the accelerant, which may initially be present in solid, suspension, or solution form. Preferably, the accelerant is in the form of an aqueous solution or suspension having a solids content of from about 5% to about 75%, usually from about 5% to about 65% and often from about 5% to about 50% by weight and more preferably from about 10% to about 35% by weight. The balance of such a suspension may be water, optionally containing various adhesive additives known in the art, such as fillers, extenders, catalysts, other cure promoters or accelerants (e.g., alkali metal and alkaline earth metal carbonates and hydroxides, such as sodium hydroxide), thickeners, adduct-forming agents (e.g., urea), and/or tack promoters (e.g., borax). Such additives are known in the art and are described, for example, in U.S. Pat. No. 4,915,766.

Preferably, the protein-based component is added as a solid powder or depending upon the moisture content of the wood source and the solids content of the polymeric quaternary amine cure accelerant, less often as a liquid suspension or solution to a suspension of the polymeric quaternary amine cure accelerant. If a solid powder form of the protein-based component is used, it is present in the thermosetting adhesive composition of the present invention preferably in an amount from about 10% to about 95% by weight, and preferably from about 25% to about 85% by weight, based on the total combined weight of the protein-based component and the polymeric quaternary amine cure accelerant suspension. If a liquid suspension or solution of the protein-based component is used, it is preferably in the form of an aqueous suspension or solution having a protein-based component content (e.g., a solids content) from about 5% to about 50% by weight and more preferably from about 10% to about 35% by weight. The balance of this suspension or solution may be water, optionally containing various additives as described above with respect to the polymeric quaternary amine cure accelerant suspension. The protein-based component liquid suspension or solution, if used in the thermosetting adhesive composition of the present invention, is preferably present in an amount from about 35% to about 95% by weight, and more preferably from about 50% to about 90% by weight based on the total combined weight of the protein-based component solution or suspension and the polymeric quaternary amine cure accelerant suspension.

Therefore, in view of (1) the preferred solids content of the polymeric quaternary amine cure accelerant suspension, (2) the preferred protein-based component powder content, and (3) the preferred relative amounts of the protein-based component powder and polymeric quaternary amine cure accelerant suspension, it is preferred that the protein-based component is preferably present in an amount from about 10% to about 99.5%, and more preferably from about 40% to about 99% by weight of the combined amount of the protein-based component and the polymeric quaternary amine cure accelerant (i.e., on a volatile-free and additive-free basis). Thus, the polymeric quaternary amine cure accelerant preferably represents from about 1% to about 60% by weight of the combined amount of accelerant and protein-based component. In an especially preferred embodiment, the polymeric quaternary amine cure accelerant represents from about 10% to about 60% by weight of the combined amount of accelerant and protein-based component. That is, the accelerant and protein-based component are preferably present in a weight ratio from about 1:9 to about 3:2.

In the process of making wood composites, such as plywood, oriented stand board (OSB), particleboard and the like, it is conventional to first dry the wood material. Historically, it was common to dry the wood material, such as wood veneers used to make plywood, to an overall moisture content of about 8-9% by weight or less. Wood material used for making wood composites often has an initial overall moisture content before any drying operation of as high as 20%. It is necessary to stabilize the wood moisture content so that press operations are consistent and product quality is maintained. For example, for OSB applications it is important that the overall moisture going into the press be less than about 10-12%. In current practice, the wood material is dried to about 4-8% moisture by weight. But the drying requirement can be more severe if extra resin has to be used to get certain board properties, in which cases it may have to be dried to less than 3% by weight. Thus, a considerable amount of energy is needed to dry the wood material properly. In addition to water, the drying operation often also causes other volatile constituents of the wood to be released. More recently, in an effort to reduce the wood drying requirements so as to reduce power (heat) consumption, possibly provide a in savings in capital costs, a reduction in processing time, a reduction is the generation of volatile organic compounds (VOCs) and also possibly an improvement in the dimensional stability of the consolidated wood product, drying requirements have been relaxed. In these more current operations, use of a wood material overall moisture content of about 10% by weight is not uncommon.

If the overall moisture content of the wood material is too high, the curing and consolidation process of making the wood composite invariably leads to a large number of bonding defects (e.g., lamination defects in the case of plywood) and an excessively large number of rejected boards or panels because of poor bonding. The bonding defects are believed to be caused by steam formation in the interior of the wood composite product (e.g., between veneer layers in the case of manufacturing plywood) and a blow out of the steam when pressure is released upon completion of the pressing cycle. As the temperature increases in the center of the wood composite during consolidation, so does the vapor pressure of any trapped steam. As the press is opened and the pressure reduced, the built-up vapor or steam seeks an avenue of escape and blows the panel. Sizable operating and capital costs have been incurred in the prior art to assure the making of wood composites in a way to eliminate bonding defects and reduce the number of rejected panels.

In the manufacturing of wood composites using the thermosetting adhesive composition of the present invention, these factors are especially important because a certain level of moisture is invariably introduced via the adhesive. Applicants have determined that to ensure consistent operation of a wood composite manufacturing process using the thermosetting adhesive of the present invention that it is critically important to observe an overall moisture balance among the wood material, the polymeric quaternary amine cure accelerant and the protein component. In particular, in any particular wood composite it is vitally important that the overall moisture input, stated as the total moisture content of the wood material used in the preparation of a board, plus the total quantity of moisture added by way of the polymeric quaternary amine cure accelerant used to make a board plus the total quantity of moisture added by way of the protein component used to make a board, amount to no more than 8 to 12% by weight of the wood material used to make the board. Stated mathematically:

Total moisture Input=((wood overall % Moisture content)×(amount of wood material))+((polymeric quaternary amine cure accelerant % moisture content)×(amount of polymeric quaternary amine cure accelerant)+((protein component % moisture content)×(amount of protein component)) and $8\% \leq$(Total Moisture Input/amount of wood material) $\leq 12\%$ Unless the moisture content of the wood material is dried to undesirably low levels, which is not only uneconomical from the standpoint of power consumption but also environmentally bad from the standpoint of excessive VOC generation, the desired Total Moisture Input per amount of wood material is very difficult to achieve satisfactorily using both a suspension or solution of polymeric quaternary amine cure accelerant and a suspension or solution of the protein component. In such circumstance, the viscosity of the adhesive prepared from the two required components tends to be too high to allow a satisfactory blending or spreading of the adhesive with or on the wood material.

Thus, in a preferred embodiment of the present invention, the wood material moisture content before the application of, or the blending with, any adhesive is maintained within or targeted for the range of 4 to 10% by weight, the polymeric quaternary amine cure accelerant is supplied as a aqueous suspension or solution having a solids content of between 5 to 75% by weight, usually between 5 and 65% by weight and most often between 5 and 50% by weight and the protein component is supplied as a dry powder, with a moisture content of less than 5% by weight, so as the place the Total Moisture Input/amount of wood material within the desired limits noted above. The polymeric quaternary amine cure accelerate is supplied as an aqueous composition and is supplied in an amount to provide 1 to 8% polymeric quaternary amine cure accelerate solids based on the weight of the wood material. In this preferred embodiment, the powdered protein component is supplied in an amount to provide 1 to 8% of protein solids based on the weight of the wood material.

A variety of ways are available for determining the moisture content of the wood material used to prepare the wood composite and the present invention is not to be limited to any particular technique. On-line sensing equipment for measuring wood moisture content in real time using conductivity sensors, microwave sensors, infra red sensors and nuclear sensors are available. For example, Brookhuis Micro-Electronics BV (Enschede, Netherlands) markets its FMI Control unit which permits the on-line measurement of minimum, maximum and average moisture contents. Other suppliers of continuous wood moisture measuring equipment include Streat Instruments, Ltd, New Zealand, Wagner Electronics Products, Inc., Exotek, Sweden and Berthold Industrial Systems. Designing any particular arrangement for determining wood moisture is well within the skill of the prior art.

The thermosetting adhesive composition of the present invention, comprising the protein-based component and polymeric quaternary amine cure accelerant as described above, may broadly be prepared in liquid or powder form. In one preferred embodiment, the powder form of the composition is prepared by drying (e.g., freeze-drying) or lyophilizing the composition and thereafter grinding it under conditions effective to form a powder. In another embodiment, a powder form of the thermosetting adhesive composition can be manufactured with a spray drier, resulting in a powder composition of improved quality, especially with respect to uniformity in particle size. The powder form of the composition may be preferred in some instances, because of an extended storage life when properly stored.

Because a large amount of energy may be needed to generate the complete adhesive in powder form, the present invention, as described above, contemplates providing the polymeric quaternary amine cure accelerant as a liquid suspension or solution and the protein component as a powder (e.g., soy powder). In this way, one is able to most efficiently manufacture the wood composite while minimizing bonding defects.

In addition to the protein-based component and the accelerant, thermosetting adhesive compositions of the present invention may further comprise other additives to improve tack, viscosity, bonding strength, cure rate, moisture resistance, and other adhesive characteristics. Thus, the thermosetting adhesive compositions may include, for example, additional curing accelerators (e.g., alkali metal and alkaline earth metal carbonates and hydroxides, such as sodium hydroxide), thickeners, fillers, extenders, adduct-forming agents (e.g., urea), and/or additional tack promoters (e.g., borax). Such additives are known in the art and are described, for example, in U.S. Pat. No. 4,915,766. Other curing accelerators include, e.g., acetates, including triacetin; carbamates; esters; lactones; carbonates; sulfates, including ammonium sulfate, sodium sulfate, and aluminum sulfate; resorcinol-formaldehyde resin, and hexamethylenetetramine.

The thermosetting adhesive compositions described herein may be used to bond cellulosic materials (e.g., particulate or layered cellulosic materials) to yield wood composite products. Accordingly, the cellulosic material comprises a wood element, such as wood flakes, wood strands, wood fibers, wood particles, or wood veneers or layers. The cellulosic material may also comprise a mixture of a plant fiber and a wood element. Useful plant fibers include wheat straw fibers, rice fibers, switchgrass fibers, soybean stalk fibers, bagasse fibers, cornstalk fibers, and mixtures thereof. Preferably, in wood composite products of the present invention, the cellulosic material is present in an amount from about 85% to about 98% by weight.

Wood flakes may be produced by procedures known to those skilled in the art and described, for example, by Koch, "Utilization of Hardwoods Growing on Southern Pine Sites," Vol. 11, USDA Forest Service, Agriculture Handbook No. 605 (1985). Fiber furnishes containing wood fiber, plant fiber, or a combination thereof may be produced by procedures known to those skilled in the art and described, for example, by Suchsland et al., "Fiberboard Manufacturing Practices in the United States," USDA Forest Service, Agriculture Handbook No. 640 (1986). Cornstalk fibers and other plant fibers may also be produced with an atmospheric disk refiner as described by Kuo et al., "Properties of Wood/Agricultural Fiberboard Bonded with Soybean-based Adhesives," For. Prod. J., 48:71-75 (1998).

The thermosetting adhesive compositions may further comprise a wax emulsion. Wax emulsions or slack wax are used in producing wood composite panels having improved moisture resistance or, more specifically, reduced water absorption and water vapor adsorption. For example, a suitable wax emulsion is Cascowax EW-403H, commercially available from Borden Chemical, Inc.

Methods of the present invention for making a wood composite involve applying the thermosetting adhesive composition to the cellulosic material comprising a wood element, as described above, to yield a thermosetting cellulosic composition. The thermosetting adhesive composition of the present invention may be applied to the cellulosic material in any conventional manner. For example, if a particulate cellulosic material (e.g., wood flakes, wood strands, wood fibers, or wood particles) is used, this material may be coated by, sprayed by, mechanically mixed into, etc., the thermosetting adhesive composition. Likewise, if wood veneers or layers are used as the cellulosic material, they may be brushed, sprayed, coated, etc., at mating surfaces, with the thermosetting adhesive composition, prior to consolidation to make a wood composite.

One method of applying the thermosetting adhesive composition is by continuous mixing of separate streams of the protein-based component and accelerant. The flow rates of the streams may be continuously monitored and adjusted to provide a protein/accelerant ratio in the thermosetting adhesive composition that varies in response to one or more measured variables (e.g., wood moisture content). Such a method is described, for example, in U.S. Pat. No. 6,607,619. Another particular method involves applying the thermosetting adhesive composition in a liquid form to cellulosic material (e.g., particulate or layered material) by a nozzle atomizer or by a spinning-disk atomizer. The thermosetting adhesive composition may also be applied in a powder form as described above. In another embodiment, the thermosetting adhesive composition is applied onto the cellulosic material by first spraying it with the liquid thermosetting adhesive composition or preferably simply the liquid polymeric quaternary amine cure accelerant and thereafter combining the resulting sprayed cellulosic material with a powder form of the thermosetting adhesive composition, or preferably just a powdered form of a protein component, such as soy powder. Thus, liquid and powder forms of the thermosetting adhesive composition may be used in combination to reduce the amount of moisture added to the cellulosic material, or in the preferred embodiment a liquid form of the polymeric quaternary amine cure accelerant and a powder form of the protein component are used in combination.

After forming the thermosetting cellulosic composition by applying the thermosetting adhesive composition to the cellulosic material, the thermosetting cellulosic composition may be consolidated, for example by heating the thermosetting cellulosic composition under pressure, into a wood composite. By consolidating the thermosetting cellulosic composition of the present invention, wood composite products exhibiting excellent strength characteristics and essentially without toxic volatile emissions can be produced. For example, in producing particleboard or fiberboard (e.g., medium density fiberboard), which are preferred wood composite products, the thermosetting cellulosic composition, containing a particulate cellulosic material, may be consolidated by spreading the thermosetting cellulosic composition to form a mat and curing the thermosetting cellulosic composition under heat and pressure. Procedures for forming mats are known in the art and are described, for example, by Maloney, MODERN PARTICLEBOARD AND DRY-PROCESS FIBERBOARD MANUFACTURING, Miller Freeman Publications, San Francisco, Calif. (1997). The formed mat is pressed to a pre-determined thickness at a sufficient pressure and at a temperature preferably ranging from about 302° F. (150° C.) to about 374° F. (190° C.) for a time from about 3 to about 10 minutes, in order to cure the thermosetting cellulosic composition and obtain the wood composite. Preferably, the mat is pressed at about 374° F.

In general, the press time and/or temperature used for consolidation of the mat may be decreased, as shown in the Examples below, by increasing the amount of polymeric quaternary amine cure accelerant added to the thermosetting adhesive composition. The preferable press time and temperature, however, also depend on the moisture content of the mat. Mats formed from particulate cellulosic material that is sprayed with the thermosetting adhesive composition in liquid form typically have a relatively higher moisture content and require a longer press time. In comparison, when the thermosetting adhesive composition is applied to particulate cellulosic material as a combination of liquid and powder form as described above, a shorter press time usually is sufficient to consolidate the mat. When used in powder form, the thermosetting adhesive composition may be mixed with particulate cellulosic material, filled in a mold, and consolidated under elevated temperature and pressure to produce a shaped wood composite (i.e., a compression molded product).

Similarly, in thermosetting cellulosic compositions of the present invention, various other types of cellulosic materials, including wood particles, fibers, and/or veneers, may be employed (in addition to particleboard and fiberboard described above) to produce wood composite panels. For example, plywood can be made from a plurality of wood layers or veneers by applying the thermosetting adhesive composition of the present invention to mating surfaces of these wood layers or veneers and thereafter consolidating them. In the case of plywood, consolidation typically comprises (i) pre-pressing the surface or surfaces of wood veneers, to which the adhesive has been contacted, under pre-pressing conditions to form a panel, followed by (ii) hot-pressing the panel at curing conditions to cure the adhesive. Pre-pressing conditions typically include ambient temperature, a pressure from about 150 psig to about 175 psig, and a time of less than about 10 minutes. The degree of pre-pressing is normally just sufficient to produce panels that resist delamination under normal conditions of storage and handling. After pre-pressing, hot-pressing is conducted to carry out or complete the cure of the thermosetting adhesive composition. Hot-pressing conditions preferably include a temperature from about 285° F. (140° C.) to about 345° F. (174° C.), a pressure from about 190 psig to about 350 psig, and a time from about 1 minute to about 15 minutes.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

COMPARATIVE EXAMPLE 1

Particleboard was made using a conventional urea-formaldehyde thermosetting resin, which was applied to oven dried wood particles to yield a thermosetting cellulosic composition. The urea-formaldehyde resin solids represented about 8% by weight of this composition. The thermosetting cellulosic composition was formed into a mat and consolidated at a temperature of 330° F. (165° C.) and a pressure of 200 psig to cure the adhesive and produce the particleboard.

EXAMPLE 1

Particleboard made according to identical procedures used in Comparative Example 1, except for the substitution of a thermosetting adhesive composition comprising a blend of a soy protein component and a polymeric quaternary amine cure accelerant for the conventional urea-formaldehyde thermosetting resin, was found to have comparatively superior internal bond strength. The total amount of the soy protein component and polymeric quaternary amine cure accelerant thermosetting adhesive composition represented 8% by weight of the thermosetting cellulosic composition, which, as described in Comparative Example 1, comprised the adhesive and wood particles.

EXAMPLE 2

To evaluate the effect on cure rate, of adding a polymeric quaternary amine cure accelerant to a thermosetting adhesive composition comprising a soy protein component, particleboard samples having the dimensions of 14"×14"×0.5" were made as described in Comparative Example 1, except for the substitution of the thermosetting adhesive composition as described in Example 1 (comprising a blend of a soy protein component and a polymeric quaternary amine cure accelerant), for the conventional urea-formaldehyde resin. The polymeric quaternary amine cure accelerant was a commercially available suspension of cationic polyazetidinium resin in water, having a 25% solids content. The soy protein component, comprising modified soy flour, was added to this suspension either as (1) a suspension in water, having a protein component content of 20% by weight, or (2) a pure powder form.

The polymeric quaternary amine cure accelerant was blended into the soy protein-based component at varying levels. A pressurized spray canister was used to introduce both the soy protein component and the polymeric quaternary amine cure accelerant into a ribbon blender. These components were mixed together and sprayed onto the oven dried wood particles used to make the particleboard. In cases where the soy protein component was added as powder, it was sprinkled slowly by hand into the top of the ribbon blender. In all cases, the amount of soy protein solids and polymeric quaternary amine cure accelerant solids represented 8% by weight of the thermosetting cellulosic composition (i.e., including the oven dried wood particles).

Results showed that the cure rate of the thermosetting adhesive compositions increased with increasing amounts of polymeric quaternary amine cure accelerant added. The increased cure rate was evidenced by an increased internal bond strength, measured according to ASTM D 1037-99, at a given press time. In the absence of any polymeric quaternary amine cure accelerant added to the soy protein component, a press time of 8-10 minutes at 330° F. (165° C.) and 200 psig was required to obtain an acceptable internal bond (IB) strength of 80 psi. In cases where the polymeric quaternary amine cure accelerant suspension was mixed with a powdered form of the soy protein component, an acceptable IB strength was obtained using a press time of <5 minutes, when the polymeric quaternary amine cure accelerant was added in an amount representing at least about 10% of the combined weight of the cure accelerant and soy protein component. In cases where the polymeric quaternary amine cure accelerant suspension was mixed with an aqueous suspension of the soy protein component, an acceptable IB strength was obtained using a press time of only 3 minutes, when the polymeric quaternary amine cure accelerant was added in an amount representing at least 55% of the combined weight of the cure accelerant and soy protein component.

The test conditions and results of the above-described experiments are provided in Tables 1 and 2 below:

TABLE 1

Average Internal Bond (IB) Strength at 4.5 Min Press Time for Various Soy Protein/Polymeric Quaternary Amine Cure Accelerant Adhesive Blends

| Thermosetting Adhesive Blend | Accelerant (wt-%), Relative to Combined Accelerant + Soy Protein | Press Time (min) | Avg. IB (psi) |
|---|---|---|---|
| 50% Soy*/50% Accelerant** | 55 | 4.5 | 124 |
| 70% Soy*/30% Accelerant** | 35 | 4.5 | 37 |
| 90% Soy*/10% Accelerant** | 12 | 4.5 | 33 |
| 70% Soy***/30% Accelerant** | 9.7 | 4.5 | 87 |

TABLE 2

Average Internal Bond (IB) Strength at 3 and 4 Min Press Time for Various Soy Protein/Polymeric Quaternary Amine Cure Accelerant Adhesive Blends

| Thermosetting Adhesive Blend | Accelerant (wt-%), Relative to Combined Accelerant + Soy Protein | Press Time (min) | Avg. IB (psi) |
|---|---|---|---|
| 50% Soy*/50% Accelerant** | 55 | 3 | 82 |
| 50% Soy*/50% Accelerant** | 55 | 4 | 110 |
| 50% Soy***/50% Accelerant** | 20 | 3 | 92 |
| 50% Soy***/50% Accelerant** | 20 | 4 | 158 |

*% added soy protein suspension, containing 20% by weight of soy.
**% added polymeric quaternary amine cure accelerant suspension, containing 25% by weight resin solids in water.
***% added soy powder

What is claimed is:

1. A method of making a wood composite, the method comprising:
   (a) supplying an amount of cellulosic material comprising a wood element and having an overall moisture content of between 4 and 10% by weight;
   (b) applying to the cellulosic material a polymeric quaternary amine cure accelerant in an amount of 1 to 8% by weight of the cellulosic material, said polymeric quaternary amine cure accelerant being supplied as an aqueous composition having a solids content of between 5 to 75% by weight
   (c) also applying to the cellulosic material a protein component in an amount of 1 to 8% by weight of the cellulosic material to yield a thermosetting cellulosic composition,
   (d) the cellulosic material, polymeric quaternary amine cure accelerant and protein component each being supplied in an amount such that Total Moisture Input per amount of cellulosic material is between 8 and 12% by weight, where the Total Moisture Input is defined as the sum of (1) a product of the overall % by weight moisture content of the cellulosic material and the amount of cellulosic material (2) a product of the polymeric quaternary amine cure accelerant % by weight moisture content and the amount of polymeric quaternary amine cure accelerant and (3) a product of the protein component % by weight moisture content and the amount of protein component and
   (e) consolidating said thermosetting cellulosic composition under heat and pressure to yield said wood composite.

2. The method of claim 1 wherein said wood composite is particleboard or fiberboard.

3. The method of claim 2 wherein said protein component is a powder.

4. The method of claim 1, wherein said consolidating step (e) comprises forming a mat from said thermosetting cellulosic composition and pressing said mat at a temperature from about 170° C. to about 190° C. for a time from about 3 to about 10 minutes.

5. The method of claim 4 wherein said protein component is a powder.

6. The method of claim 1 wherein the wood element is selected from the group consisting of wood flakes, wood strands, wood fibers, wood particles, and wood veneers or layers.

7. The method of claim 1 wherein the wood element further comprises a plant fiber selected from the group consisting of wheat straw fibers, rice fibers, switchgrass fibers, soybean stalk fibers, bagasse fibers, cornstalk fibers, and mixtures thereof.

8. The method of claim 1 wherein said consolidating step (c) comprises forming a mat from said thermosetting cellulosic composition and pressing said mat at a temperature from about 140° C. to about 174° C., a pressure from about 190 psig to about 350 psig, and a time from about 1 minute to about 15 minutes.

* * * * *